US012596971B2

(12) United States Patent
Yin et al.

(10) Patent No.: US 12,596,971 B2
(45) Date of Patent: Apr. 7, 2026

(54) PRIVILEGE MANAGEMENT FOR ELECTRONIC WORKSPACES

(71) Applicant: Citrix Systems, Inc., Ft. Lauderdale, FL (US)

(72) Inventors: Jia Yin, Nanjing (CN); Zongpeng Qiao, Nanjing (CN); Wenshuang Zhang, Nanjing (CN); Xuan Liu, Nanjing (CN)

( * ) Notice: Subject to any disclaimer, the term of this patent is extended or adjusted under 35 U.S.C. 154(b) by 756 days.

(21) Appl. No.: 17/811,974

(22) Filed: Jul. 12, 2022

(65) Prior Publication Data

US 2023/0409997 A1     Dec. 21, 2023

Related U.S. Application Data

(63) Continuation of application No. PCT/CN2022/098835, filed on Jun. 15, 2022.

(51) Int. Cl.
*G06Q 10/0631*     (2023.01)
*G06Q 10/0639*     (2023.01)

(52) U.S. Cl.
CPC ............... *G06Q 10/063112* (2013.01); *G06Q 10/06398* (2013.01)

(58) Field of Classification Search
CPC .................. G06Q 10/063112; G06Q 10/06398
See application file for complete search history.

(56) References Cited

U.S. PATENT DOCUMENTS 8,620,842 B1     12/2013     Cormack
10,839,460 B1 *     11/2020     Brandmaier ............ H04W 4/08

10,885,478 B2 *     1/2021     Roberts .......... G06Q 10/063112
11,113,617 B1     9/2021     Liu
2002/0029161 A1     3/2002     Brodersen et al.
2005/0073958 A1     4/2005     Atlas et al.
2007/0234102 A1     10/2007     Fan et al.
2008/0101244 A1     5/2008     Liu et al.
2009/0187537 A1     7/2009     Yachin et al.
2014/0114713 A1     4/2014     Ben Simhon et al.
(Continued)

FOREIGN PATENT DOCUMENTS

CN     102664744 A     9/2012
CN     106230700 A     12/2016
(Continued)

OTHER PUBLICATIONS

"Dijkstra'z algorithm", Retrieved from "https://en.wikipedia.org/w/index.php?title=Dijkstra%27s_algorithm&oldid=966262952", downloaded Jul. 14, 2020, 12 pages.
(Continued)

*Primary Examiner* — Javier O Guzman

(57)     ABSTRACT

A privilege management method includes receiving, from a first user via a privileges plugin, a request to recommend a candidate to perform a task on behalf of the first user; calculating, responsive to the request to recommend the candidate, a recommendation score for each of a plurality of second users based on a position level score, a capability level score, a task similarity score, and a familiarity score; and sending a list of recommended candidates to the first user via the privileges plugin, where the list of recommended candidates includes at least one of the second users for which the recommendation score is greater than a threshold score.

11 Claims, 10 Drawing Sheets

(56) References Cited

U.S. PATENT DOCUMENTS

| | | | |
|---|---|---|---|
| 2014/0214467 A1* | 7/2014 | Asur | G06Q 10/063112 |
| | | | 705/7.14 |
| 2014/0317079 A1 | 10/2014 | Obernikhin et al. | |
| 2015/0025928 A1* | 1/2015 | Kang | G06Q 10/063112 |
| | | | 705/7.14 |
| 2015/0188851 A1 | 7/2015 | Tomkins et al. | |
| 2016/0110826 A1 | 4/2016 | Morimoto et al. | |
| 2016/0139791 A1 | 5/2016 | Mcconnell | |
| 2016/0300194 A1 | 10/2016 | Cornelsen | |
| 2016/0323398 A1 | 11/2016 | Guo et al. | |
| 2017/0206478 A1 | 7/2017 | Deshpande et al. | |
| 2017/0213179 A1 | 7/2017 | Schissel et al. | |
| 2017/0270115 A1 | 9/2017 | Cormack et al. | |
| 2017/0270456 A1* | 9/2017 | Branagh | G06Q 10/06398 |
| 2017/0344954 A1 | 11/2017 | Xu et al. | |
| 2018/0046520 A1 | 2/2018 | Baughman et al. | |
| 2018/0060426 A1* | 3/2018 | Gluck | G06F 16/353 |
| 2018/0091654 A1* | 3/2018 | Miller | H04M 3/42221 |
| 2018/0232751 A1* | 8/2018 | Terhark | G06Q 10/063118 |
| 2018/0239829 A1* | 8/2018 | Dialani | G06Q 10/1053 |
| 2018/0239830 A1* | 8/2018 | Dialani | G06N 5/022 |
| 2019/0108217 A1 | 4/2019 | Chen | |
| 2019/0197422 A1* | 6/2019 | Chen | G06F 18/29 |
| 2019/0197427 A1 | 6/2019 | Hwang | |
| 2019/0340554 A1* | 11/2019 | Dotan-Cohen | G06Q 10/06313 |
| 2020/0065736 A1* | 2/2020 | Relangi | G06N 20/20 |
| 2020/0074311 A1 | 3/2020 | Li et al. | |
| 2020/0084123 A1 | 3/2020 | Kline et al. | |
| 2020/0287736 A1 | 9/2020 | Zhuk et al. | |
| 2021/0035116 A1 | 2/2021 | Berrington et al. | |
| 2021/0051121 A1 | 2/2021 | Menon et al. | |
| 2021/0105147 A1 | 4/2021 | Waugh et al. | |
| 2021/0117928 A1 | 4/2021 | Gupta et al. | |
| 2021/0273965 A1 | 9/2021 | Pi et al. | |
| 2021/0280195 A1 | 9/2021 | Srinivasan et al. | |
| 2022/0343251 A1* | 10/2022 | Yang | G06Q 10/063114 |
| 2023/0041255 A1* | 2/2023 | Matsuoka | G06Q 10/063116 |

FOREIGN PATENT DOCUMENTS

| | | | | | |
|---|---|---|---|---|---|
| CN | 106850417 A | 6/2017 | | | |
| CN | 107958317 A | 4/2018 | | | |
| CN | 110298639 A | 10/2019 | | | |
| CN | 111754121 A | 10/2020 | | | |
| CN | 111919230 A | 11/2020 | | | |
| WO | 2015043288 A1 | 4/2015 | | | |
| WO | 2019068253 A1 | 4/2019 | | | |
| WO | WO-2020106481 A1 * | 5/2020 | | ..... | G06Q 10/063112 |

OTHER PUBLICATIONS

"Profiling (information science)", Retrieved from "https://en.wikipedia.org/w/index.php?title=Profiling_(information_science)&oldid=954888702", downloaded Jul. 14, 2020, 7 pages.

"Topic Model", Retrieved from "https://en.wikipedia.org/w/index.php?title=Topic_model&oldid=963465133", downloaded Jul. 14, 2020, 6 pages.

International Search Report mailed Mar. 8, 2021 for International Patent Application PCT/CN2020/095109, 4 pages.

Jonsson, et al., "Automated Bug Assignment: Ensemble-based Machine Learning in Large Scale Industrial Contexts", Empirical Software Engineering (preprint), uploaded at https://www.researchgate.net/publication/281740475 (Sep. 14, 2015).

Satish C J, et al., "Automated Bug Assignment in Software Maintenance Using Graph Databases", I.J. Intelligent Systems and Applications, 2, 27-36 (Feb. 2018).

Written Opinion mailed Mar. 8, 2021 for International Patent Application PCT/CN2020/095109, 4 pages.

International Search Report and Written Opinion of the International Searching Authority for International Application No. PCT/US2021/028633 mailed Jul. 26, 2021, 11 pages.

International Search Report and Written Opinion of the International Searching Authority for International Application No. PCT/CN2021/116569 mailed May 25, 2022, 8 pages.

International Search Report and Written Opinion of the International Searching Authority for International Application No. PCT/CN2021/114680 mailed May 27, 2022, 8 pages.

* cited by examiner

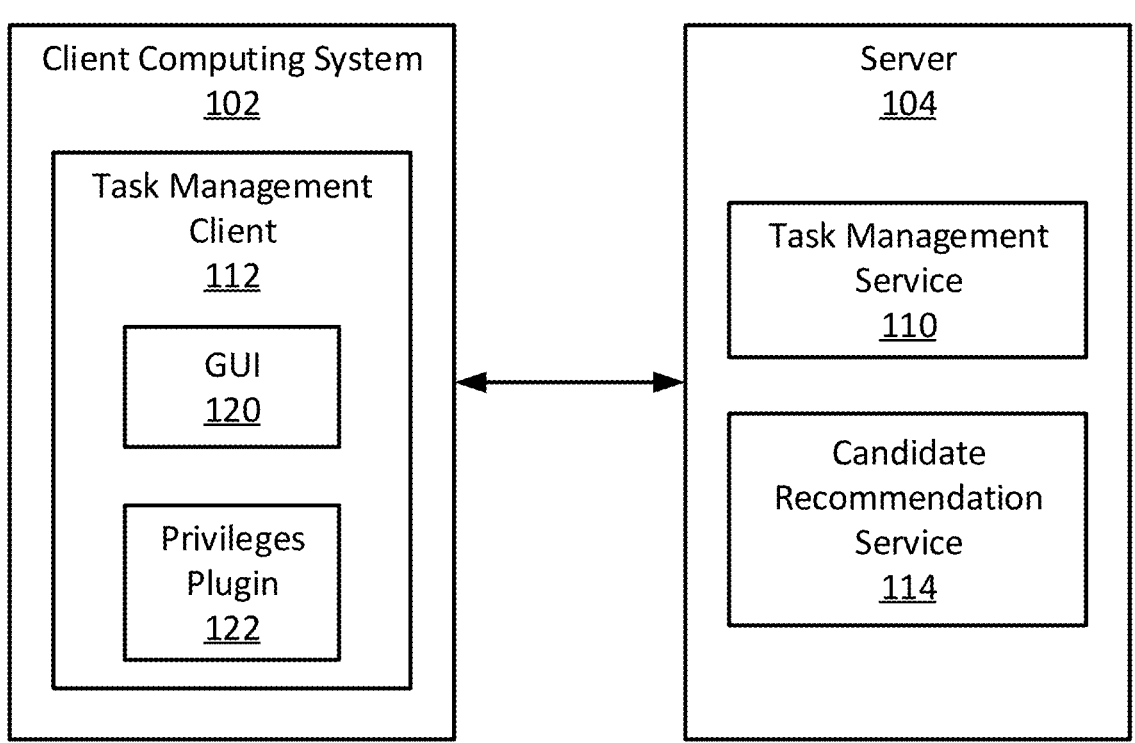
FIG. 1

Figure 3:
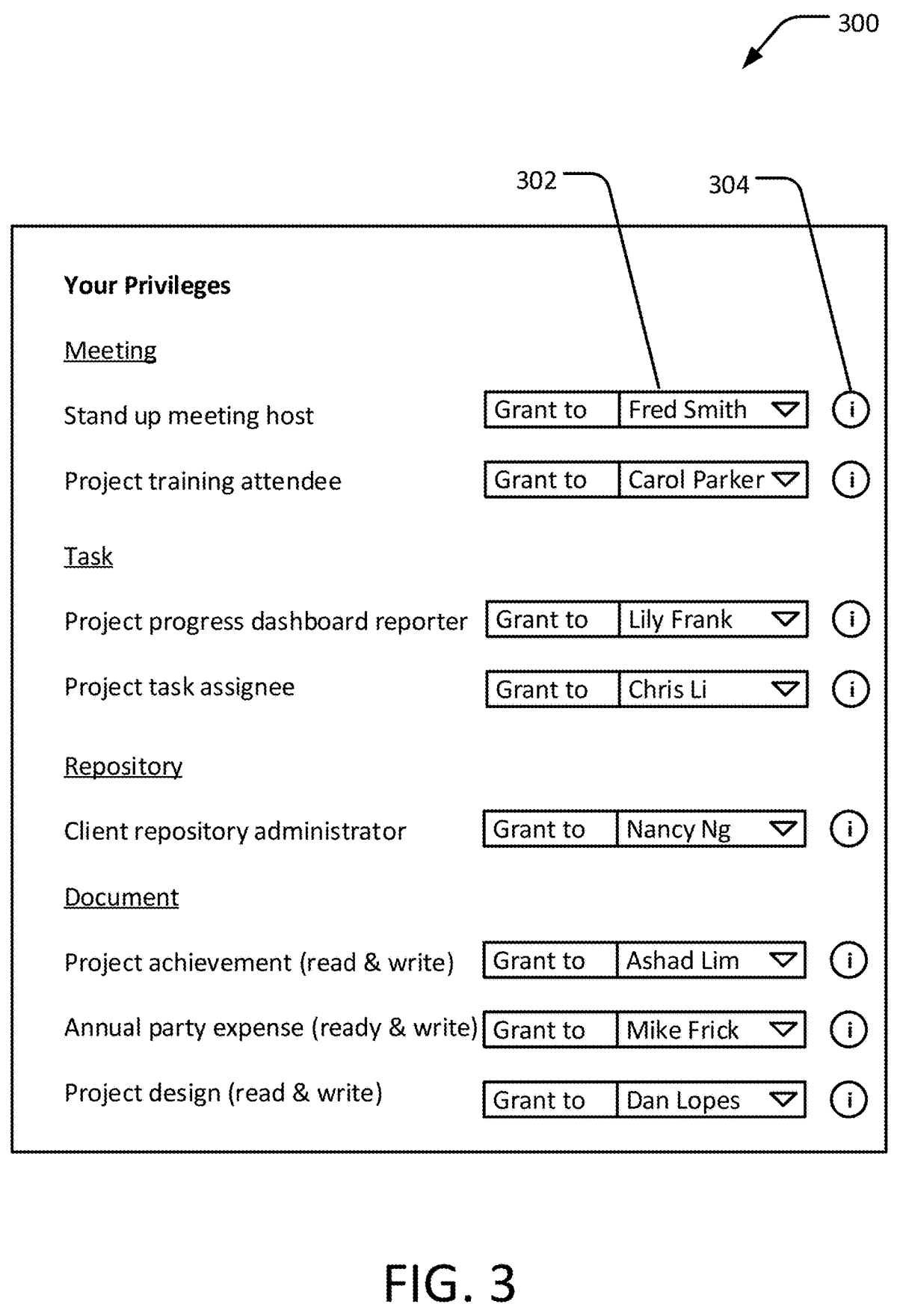

300

302            304

Your Privileges

<u>Meeting</u>

Stand up meeting host                    | Grant to | Fred Smith ▽ | (i)

Project training attendee                | Grant to | Carol Parker ▽ | (i)

<u>Task</u>

Project progress dashboard reporter      | Grant to | Lily Frank ▽ | (i)

Project task assignee                    | Grant to | Chris Li ▽ | (i)

<u>Repository</u>

Client repository administrator          | Grant to | Nancy Ng ▽ | (i)

<u>Document</u>

Project achievement (read & write)       | Grant to | Ashad Lim ▽ | (i)

Annual party expense (ready & write)     | Grant to | Mike Frick ▽ | (i)

Project design (read & write)            | Grant to | Dan Lopes ▽ | (i)

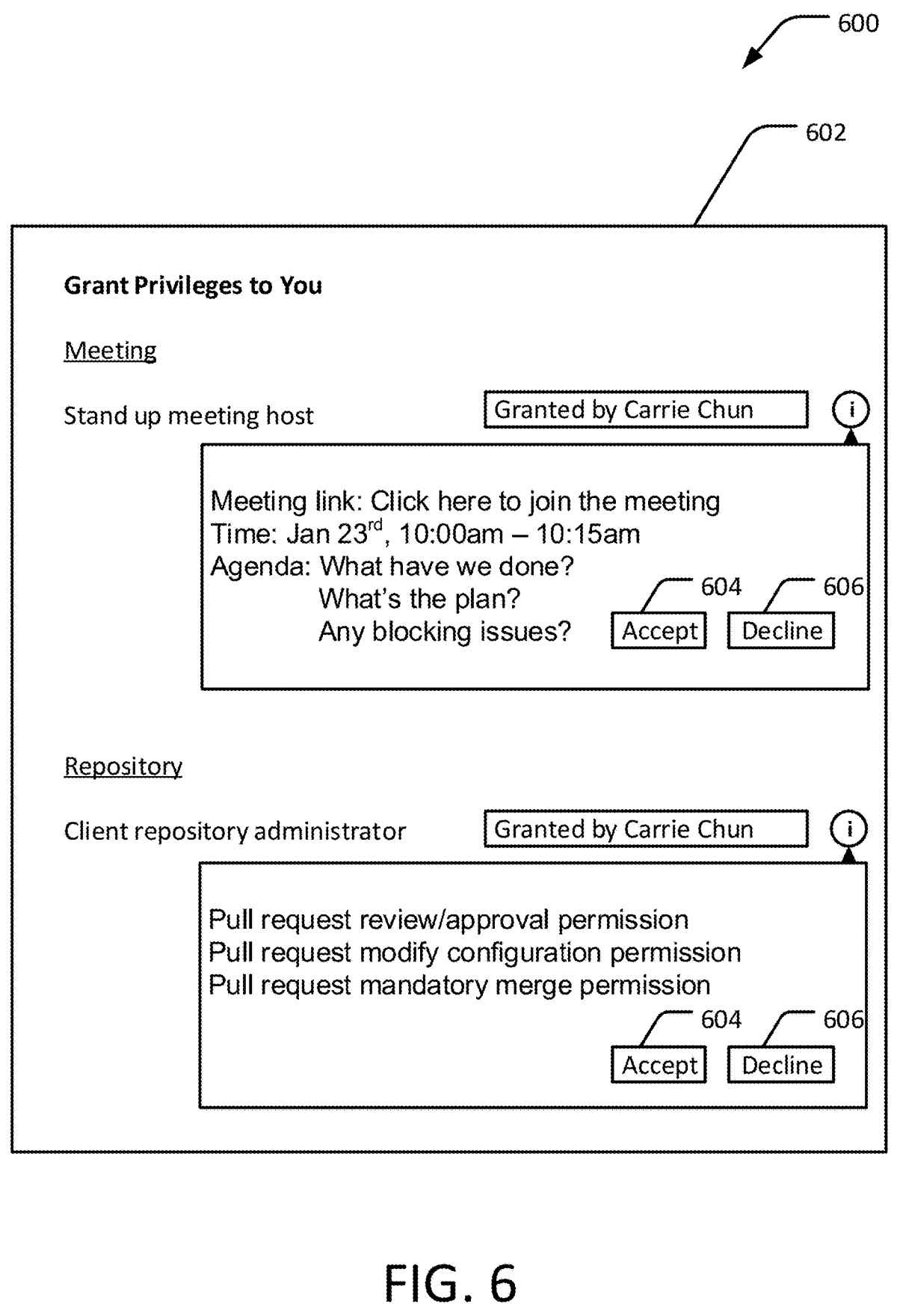

Grant Privileges to You

<u>Meeting</u>

Stand up meeting host      | Granted by Carrie Chun |   (i)

Meeting link: Click here to join the meeting
Time: Jan 23$^{rd}$, 10:00am – 10:15am
Agenda: What have we done?
       What's the plan?     604     606
       Any blocking issues?   | Accept |   | Decline |

<u>Repository</u>

Client repository administrator    | Granted by Carrie Chun |   (i)

Pull request review/approval permission
Pull request modify configuration permission
Pull request mandatory merge permission
                  604     606
                  | Accept |   | Decline |

FIG. 6

PRIVILEGE MANAGEMENT FOR ELECTRONIC WORKSPACES

BACKGROUND

Electronic workspaces are computing environments where users access data and applications in the course of their work. Some workspaces are defined by files and directories, stored locally or accessed via a communication network such as an intranet, a virtual private network (VPN), or the Internet, while other workspaces provide broader collaborative and coordinated access to technology. Yet other workspaces provide software-as-a-service (SaaS), which facilitates enhanced reliability, efficiency, and security across an enterprise or distributed work environment. Regardless of how a workspace is implemented, the security of the environment is of paramount importance to mitigate the risk of information loss, theft, or misappropriation, as well as to comply with data privacy and other regulatory requirements.

In some typical workspace environments, security is implemented via a set of rights that grant users privileges to access designated resources, such as data and applications. For example, privileges can be assigned to individual users or groups of users as needed for each user to accomplish certain tasks, such as the ability to access, read, write, and/or delete documents. Often these privileges are managed by an administrator or another user with authorization to grant and revoke the security rights within the workspace based on business needs. When business needs change, such as due to a change in roles or temporary need for a user to access a particular resource, work may be delayed until the necessary rights are granted by an authorized entity.

SUMMARY

One example provides a privilege management method including receiving, by a processor and from a first user via a privileges plugin, a request to recommend a candidate to perform a task on behalf of the first user; calculating, by the processor and responsive to the request to recommend the candidate, a recommendation score for each of a plurality of second users based on a position level score, a capability level score, a task similarity score, and a familiarity score; and sending, by the processor, a list of recommended candidates to the first user via the privileges plugin, the list of recommended candidates including at least one of the second users for which the recommendation score is greater than a threshold score. In some examples, the method further includes granting, to one of the second users selected by the first user from the list of recommended candidates, one or more privileges for performing the task. In some examples, the method further includes calculating the position level score for each of the second users based on a difference between a position level of the first user and a position level of each of the second users. In some examples, the method further includes calculating the capability level score for each of the second users based on a capability level of each of the second users, the capability level representing an existing privilege held by each of the second users for performing the task. In some examples, the method further includes calculating the task similarity score based at least in part on a term frequency-inverse document frequency matrix representing words in a description of the task to be performed on behalf of the first user and words in a description of one or more tasks previously performed by each of the second users. In some examples, the method further includes calculating the familiarity score based at least in part on a frequency of electronic communications between the first user and each of the second users. In some examples, the recommendation score is a weighted sum of the position level score, the capability level score, the task similarity score, and the familiarity score.

Another example provides a computer program product including one or more non-transitory machine-readable mediums having instructions encoded thereon that when executed by at least one processor cause a process for managing privileges to be carried out. The process includes receiving, from a first user via a privileges plugin, a request to recommend a candidate to perform a task on behalf of the first user; calculating, responsive to the request to recommend the candidate, a recommendation score for each of a plurality of second users based on a position level score, a capability level score, a task similarity score, and a familiarity score; and sending a list of recommended candidates to the first user via a privileges plugin, the list of recommended candidates including at least one of the second users for which the recommendation score is greater than a threshold score. In some examples, the process further includes granting, to one of the second users selected by the first user from the list of recommended candidates, one or more privileges for performing the task. In some examples, the process further includes calculating the position level score for each of the second users based on a difference between a position level of the first user and a position level of each of the second users. In some examples, the process further includes calculating the capability level score for each of the second users based on a capability level of each of the second users, the capability level representing an existing privilege held by each of the second users for performing the task. In some examples, the process further includes calculating the task similarity score based at least in part on a term frequency-inverse document frequency matrix representing words in a description of the task to be performed on behalf of the first user and words in a description of one or more tasks previously performed by each of the second users. In some examples, the process further includes calculating the familiarity score based at least in part on a frequency of electronic communications between the first user and each of the second users. In some examples, the recommendation score is a weighted sum of the position level score, the capability level score, the task similarity score, and the familiarity score.

Yet another example provides a system including a storage and at least one processor operatively coupled to the storage. The at least one processor is configured to execute instructions stored in the storage that when executed cause the at least one processor to carry out a process for managing privileges. The process includes receiving, from a first user via a privileges plugin, a request to recommend a candidate to perform a task on behalf of the first user; calculating, responsive to the request to recommend the candidate, a recommendation score for each of a plurality of second users based on a position level score, a capability level score, a task similarity score, and a familiarity score; and sending a list of recommended candidates to the privilege management service for display to the first user, the list of recommended candidates including at least one of the second users for which the recommendation score is greater than a threshold score. In some examples, the process further includes granting, to one of the second users selected by the first user from the list of recommended candidates, one or more privileges for performing the task. In some examples, the process further includes calculating the position level score for each of the second users based on a difference between a position level of the first user and a position level of each of the second users. In some examples, the process further includes calculating the capability level score for each of the second users based on a capability level of each of the second users, the capability level representing an existing privilege held by each of the second users for performing the task. In some examples, the process further includes calculating the task similarity score based at least in part on a term frequency-inverse document frequency matrix representing words in a description of the task to be performed on behalf of the first user and words in a description of one or more tasks previously performed by each of the second users. In some examples, the process further includes calculating the familiarity score based at least in part on a frequency of electronic communications between the first user and each of the second users.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 1 is a block diagram of a privilege management system, in accordance with an example of the present disclosure.

FIGS. 3, 4, 5 and 6 each show a graphical user interface for granting privileges, in accordance with several examples of the present disclosure.

DETAILED DESCRIPTION

Overview

Figure 2:
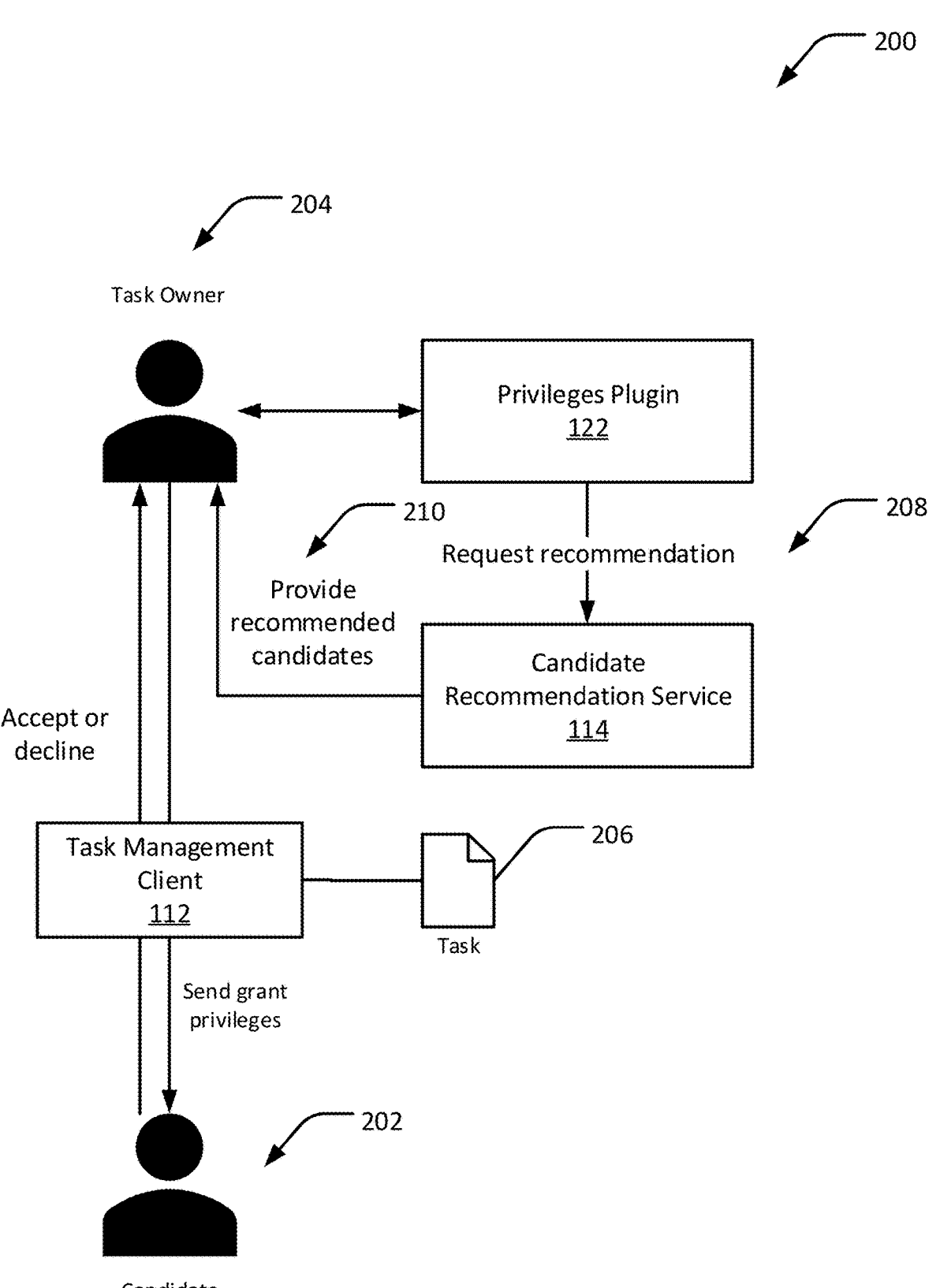
FIG. 2 is a block diagram of a system for recommending one or more candidates to a task owner, in accordance with an example of the present disclosure.

As noted above, within an electronic workspace, various privileges can be assigned to individual users or groups of users as needed for each user to accomplish certain tasks. Different users within a team can be granted privileges needed for each user to perform one or more tasks associated with a project. For example, a lead team member may be granted privileges to schedule meetings, modify documents, and manage data in a storage repository, while another team member may be granted privileges to read documents and generate reports. Thus, there may be situations where only one team member has privilege to perform a given task.

However, there can be instances where a team member may be unavailable to perform his or her assigned tasks, such as due to scheduling conflicts, training, illness, travel, or lack of network access. Thus, if a team member is unavailable to perform a task in a timely manner, then there may be repercussions for the entire team. For instance, if a task is urgent and the only user with privilege to perform the task is unavailable, then the project may be delayed, important information may be missed, or the work of other team members may be adversely affected. To address this, the user owning the task (or otherwise having privileges to perform the task) may choose to delegate privileges to another user so that the other user can perform the task on behalf of the user (task owner). However, important questions may arise: to whom should the privileges be delegated? And which user is most suited to assume responsibility for performing the task?

To this end, techniques are disclosed for managing privileges within an electronic workspace. In some examples, the techniques include recommending, to a user, one or more candidates to at least temporarily receive privileges to perform certain tasks on behalf of the user, such as while the user is unavailable to perform the tasks. The candidates are other users who have had at least one electronic communication with the user (e.g., via email, project management tools, social media, or other information exchange system) and are based on the existing privileges of the user with respect to the tasks that the user wishes to delegate. The user can then grant, or request an administrator to grant, privileges to one or more of the recommended candidates so that the candidate(s) can perform the task(s) on behalf of the user. The privileges can vary but may include, for example, meeting host or attendee privileges, administrative privileges for maintaining a data repository, and read and write privileges for one or more documents.

A multi-dimensional process, which is described in further detail below, is used to recommend the candidates, who are ranked based on factors including position level, capability level, task similarity, and familiarity with the user. After generating the candidate(s), the user can grant privileges to the highest-ranked candidate or send a request to an administrator to grant the privileges. If the candidate accepts, related privileges and tasks will be granted to him/her for a certain amount of time. Otherwise, the user can grant the privileges to the next highest-ranked candidate or send a request to the administrator to grant the privileges, repeating until one of the candidates accepts. In some examples, tasks performed by the candidate after privileges are granted are reported back to the user.

Delegation of tasks, via the disclosed multi-dimensional process, decreases computing resources required to operate the electronic workspace. For example, the disclosed techniques allow a task owner to quickly identify one or more suitable candidates to assume responsibility for completing the task in a timely manner, and to delegate the privileges needed to perform the task to those candidates efficiently, which reduces further delays or other impedances. In another example, the disclosed techniques assist a task owner in identifying suitable candidates on the basis of factors, such as task familiarity and the capabilities of the candidates, that the task owner may not otherwise consider or have sufficient information for fully considering, thus leading to better outcomes. In yet another example, information regarding completed tasks can be removed from the electronic workspace or archived to storage with higher capacity and lower cost than storage required to store information regarding incomplete and stalled tasks. Additionally, in some instances, the examples described herein autonomously grant privileges to users to enable the users to complete delegated tasks. Such autonomous delegation decreases computing resources required to render user interfaces to administrators. Other technological benefits of the examples disclosed herein will be apparent.

Privilege Management System

FIG. 1 is a block diagram of a privilege management system 100, in accordance with an example of the present disclosure. The system 100 includes a client computing system 102 and a server 104. The server 104 is configured to provide a task management service 110 and a candidate recommendation service 114 that supports a task management client 112 executing on the client computing system 102. The task management client 112 includes a graphical user interface 120 that permits a user to interact with the task management client 112 and a privileges plugin 122 that is configured to interact with the task management service 110 and the candidate recommendation service 114. The client computing system 102, the task management client 112, the server 104, the task management service 110, and the candidate recommendation service 114 can each be in communication with other components of the system 100 using, for example, a local area network, a wide area network, or any type of wired or wireless network.

In some examples, the server 104 can provide operational support for the task management service 110 and the candidate recommendation service 114, and communications support between the task management service 110, the candidate recommendation service 114, and the task management client 112. The task management service 110 can provide tools for individuals, teams, or organizations to complete projects by organizing, classifying, prioritizing, and recommending tasks to the end user(s). Additionally, the task management service 110 is configured to exchange data or otherwise interact with the candidate recommendation service 114. For example, as discussed in further detail below, the candidate recommendation service 114 can collect information about various tasks, information about one or more users who perform the tasks, and/or privileges associated with the users, and provide candidate recommendations to the user via the task management service 110 based on the tasks, users, and/or privileges.

Task Recommendation Process

FIG. 2 is a block diagram of a system 200 for recommending one or more candidates 202 to a task owner 204, in accordance with an example of the present disclosure. The system 200 includes at least portions of the system 100 of FIG. 1, including the task management service 110, the privileges plugin 122, and the candidate recommendation service 114. As noted above, the task owner 204 may have one or more tasks 206, as specified by any of the task management services 110, that need to be completed. The task owner 204 generally has privileges needed to complete the task 206. However, there may be instances where the task owner 204 is unable to perform the task 206 for various reasons, such as unavailability due to schedule conflicts, illness, travel, training, and so forth. If the task owner 204 is unable to complete the task 206 in a timely manner, the project may be delayed. Thus, the task owner 204 may wish to delegate the task to another user so that the other user can perform the task on behalf of, or instead of, the task owner 204.

Figure 4:
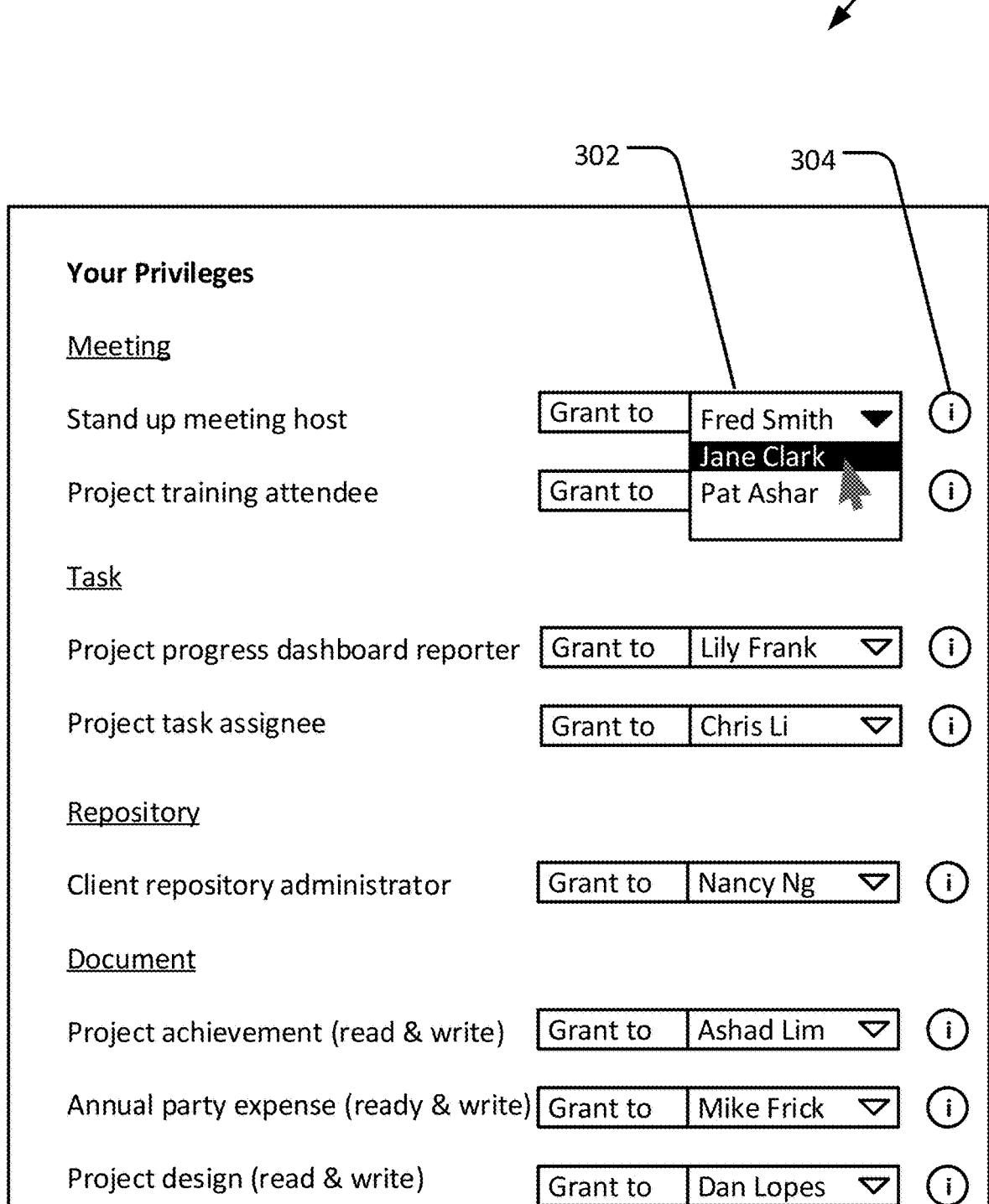
Figure 5:
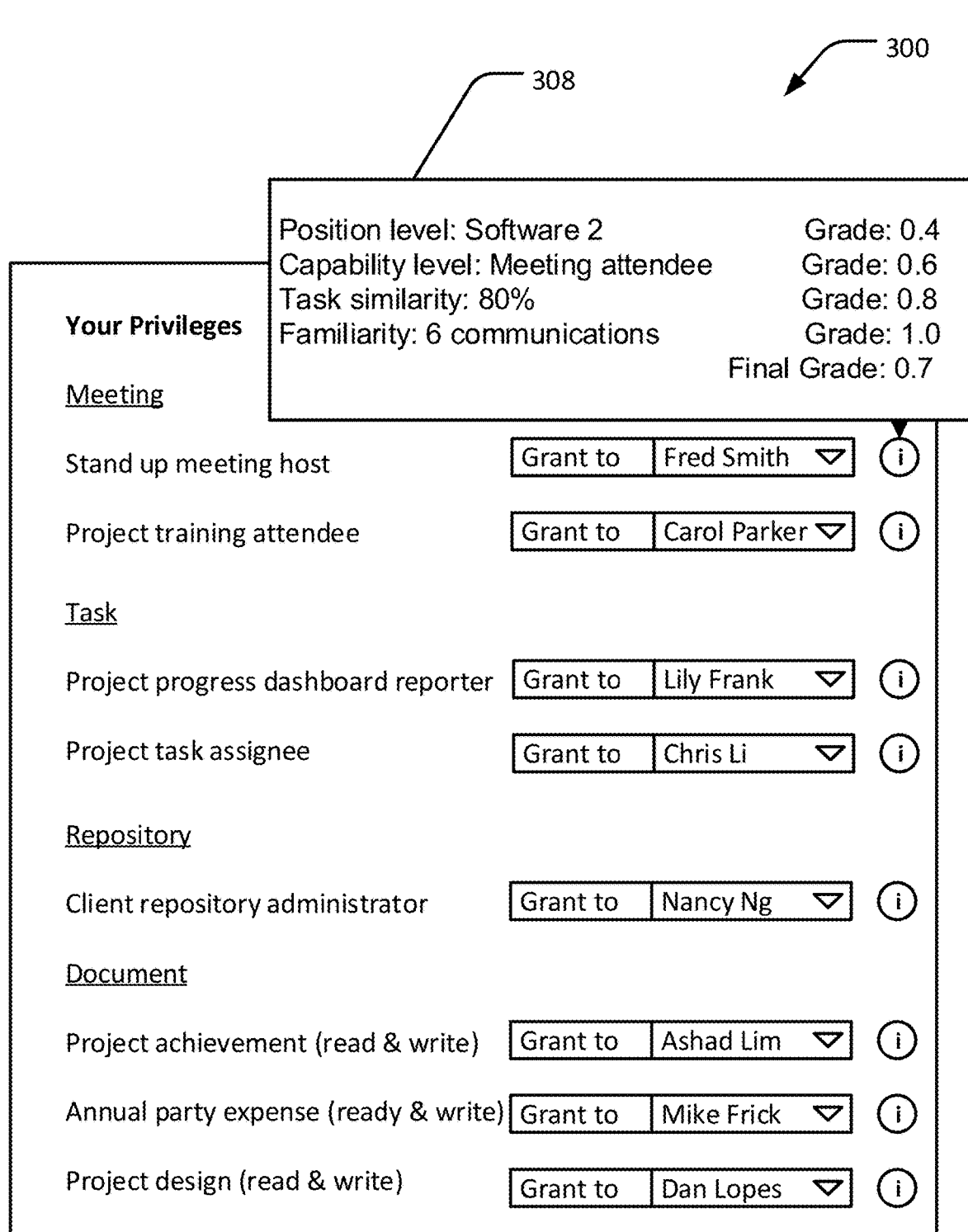

In such instances where the task owner 204 wishes to delegate the task 206 to another user, the task owner can request a recommendation 208 from the candidate recommendation service 114. The privileges plugin 122 facilitates the request by sending the privileges held by the task owner 204 (at least with respect to the task 206) to the candidate recommendation service 114 for further processing. In turn, the candidate recommendation service 114 provides a list of recommended candidates 210 to the task owner 204. The list of recommended candidates is generated by the candidate recommendation service 114 using a multi-dimensional process, which is described in further detail below, where the candidate(s) 202 are ranked based on factors including position level, capability level, task similarity, and familiarity with the task owner 204. The list of recommended candidates 210 is presented to the task owner 204 via the GUI 120 of the task management client 112, such as shown in FIGS. 3, 4, and 5. The task owner 204 can select one of the candidates 202, via the GUI 120, to grant privileges to the candidate 202 for performing the task 206. The candidate 202 can accept or decline the privileges. If the candidate 202 accepts the privileges, the privileges are granted to the candidate 202, and the candidate 202 can then perform the task 206 using the granted privileges. In some cases, the candidate 202 may already hold all of the privileges needed to perform the task 206; in such cases, the candidate 202 can perform the task 206 without receiving any further privileges. Otherwise, if the candidate 202 declines, the task owner 204 can select another candidate 202, via the GUI 120, to grant the privileges to that candidate 202 for performing the task 206.

Example Graphical User Interface for Granting Privileges

FIGS. 3, 4, and 5 show a graphical user interface 300 for granting privileges, in accordance with an example of the present disclosure. In this example, the GUI 300 displays controls 302 configured to interact with a user with respect to various tasks. As shown, the GUI 300 groups tasks controls by category, such as meeting privileges, project management tasks, repository management operations, and document operations. One or more candidates can be recommended for each category. Where more than one candidate is recommended for a given category, the GUI 300 is configured to display a drop-down list within the controls 302 showing each of the candidate names, such as shown in FIG. 4. In some examples, when a user clicks on an "information" button 304, the GUI 300 is configured to display details 308 regarding the recommendation, such as shown in FIG. 5. For instance, the attributes and scores associated with the recommended candidate can be displayed in a pop-up box 308, as shown.

FIG. 6 shows another graphical user interface 600 for granting privileges, in accordance with an example of the present disclosure. If the user selects the "Grant to" button next to the selected candidate name (as shown in FIG. 3), the GUI 600 displays a notification dialog or information box 602 to the candidate user, such as shown in FIG. 6. The notification 602 indicates the category of the task(s), the task(s), the name of the user granting privileges for performing the tasks, and "accept" and "decline" buttons along with other pertinent information about the task, such as a meeting time or itemized task description. For each task, the candidate user can either accept the task by clicking the "accept" button 604 or decline the task by clicking the "decline" button 606 within the GUI 600.

Once the candidate user accepts the task, the privileges needed to perform the task will be provided to the candidate user, along with any relevant information (e.g., documents, links, etc.) corresponding to the task. If, on the other hand, the candidate user declines the task, the user who owns the tasks can select the next candidate from the list (such as shown in FIG. 4), if any, and select the "Grant to" button as described above.

Example Workflows

Figure 7:
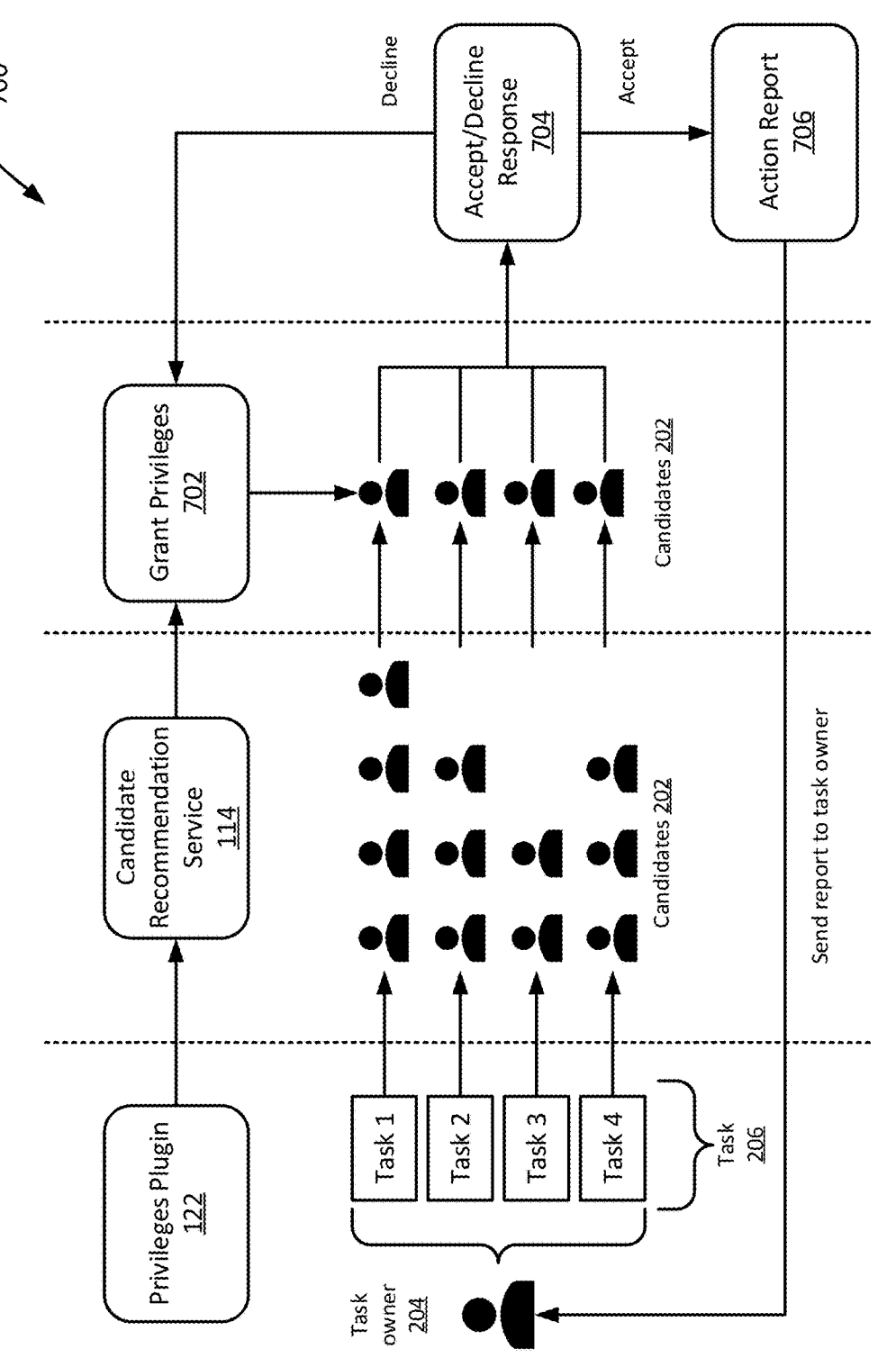
FIG. 7 is a flow diagram of a privilege management workflow, in accordance with an example of the present disclosure.

FIG. 7 is a flow diagram of a privilege management workflow 700, in accordance with an example of the present disclosure. The privileges plugin 122 is configured to retrieve privileges granted to the task owner 204 for each task 206 (e.g., Task 1, Task 2, Task 3, Task 4, etc.), such as "meeting host," "meeting attendee," "task reporter," "task assignee," "repository administrator," "document read & write" privileges, etc. For each task 206, one or more candidate users 202 are recommended by the candidate recommendation service 114, according to one or more factors such as described in further detail below. The candidate recommendation service 114 provides one or more candidate users 202 to the task owner 204, who can then grant privileges 702 to the selected candidate 202 (either directly or via an administrator). If the request is accepted or declined 704 by the candidate 202, the task owner 204 is notified. If the request is accepted, the privileges are granted to the candidate 202 along with any related materials for performing the task 206. In some examples, an action report 706 is generated after the candidate performs the task 206. The action report 706 is sent to the task owner 204 and includes information relevant to performance of the task 206 (such as when the task 206 was completed, and any materials or information generated during performance of the task 206). If the request is declined, the task owner 204 can select another candidate 202 from among the candidates recommended by the candidate recommendation service 114.

Figure 8:
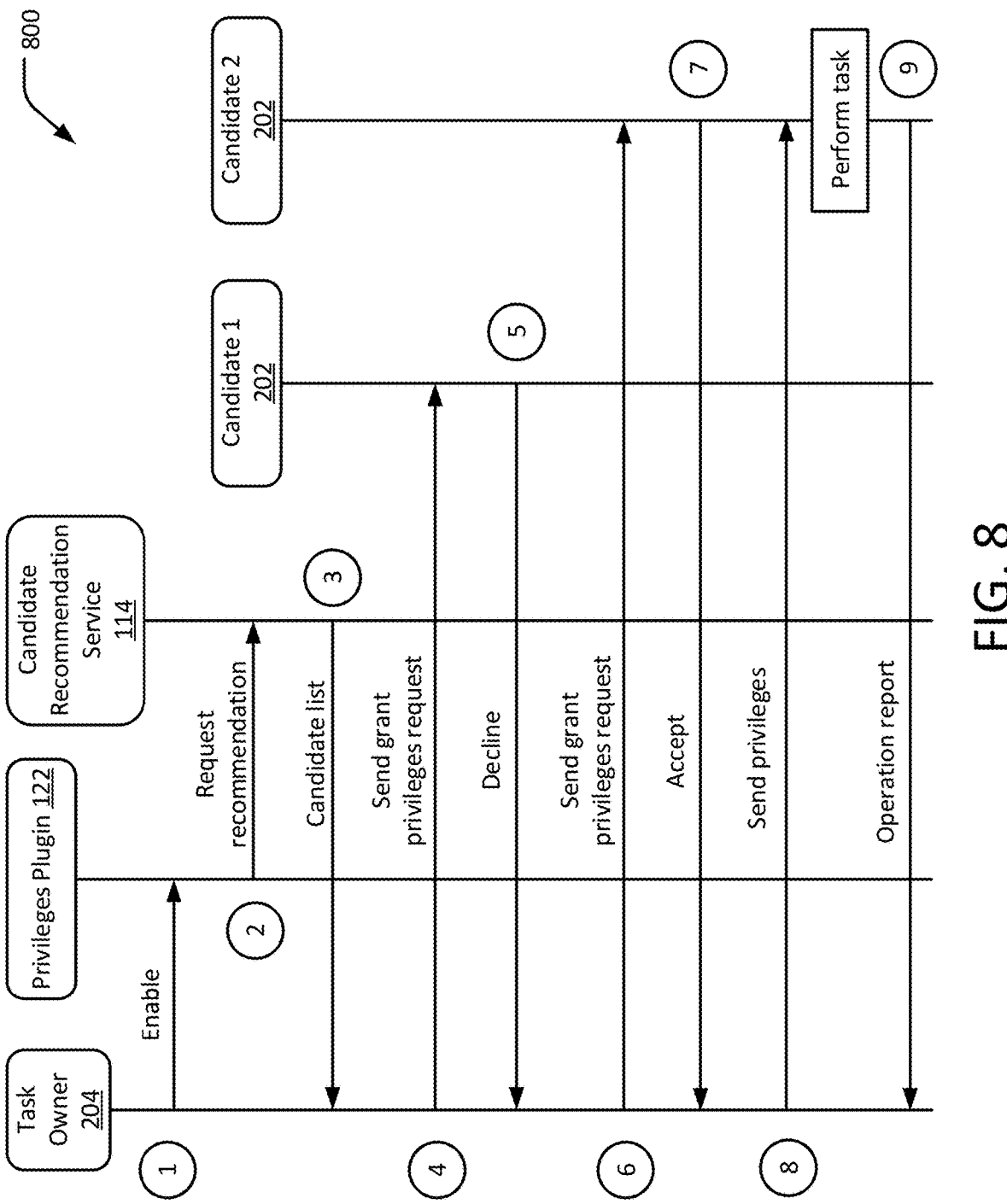
FIG. 8 is a flow diagram of another privilege management workflow, in accordance with an example of the present disclosure.

FIG. 8 is a flow diagram of another privilege management workflow 800, in accordance with an example of the present disclosure. At step 1, the task owner 204 sends an enable to the privileges plugin 122. At step 2, the privileges plugin 122 sends a request to the candidate recommendation service 114 for a list of recommended candidates. At step 3, the privileges plugin 122 returns a list of candidates to the task owner 204. At step 4, the task owner 204 selects one of the candidates (e.g., candidate 1) from the list of candidates and sends a grant privileges request to the selected candidate. At step 5, the candidate declines the request. At step 6, the task owner 204 selects another one of the candidates (e.g., candidate 2) from the list of candidates and sends another grant privileges request to the selected candidate. At step 7, the selected candidate accepts the request. At step 8, the task owner 204 sends the privileges needed for performing the task to the candidate, who then performs the task on behalf of the task owner. At step 9, the candidate sends an operation report to the task owner 204, which can include information resulting from performance of the task (e.g., results of the task).

Candidate Recommendation Factors

As noted above, various factors are used to recommend candidates for performing a task on behalf of the task owner. For example, the factors can include the position levels of the task owner 204 and the candidates 202 relative to each other (e.g., how close the position levels are), the capabilities of the candidates 202 (e.g., which privileges are held by the candidates with respect to the task 206), task similarity (e.g., whether the candidate has performed similar tasks in the past), and familiarity between the task owner 204 and the candidate 202 (e.g., the frequency at which the task owner 204 and the candidate 202 have interacted electronically).

These factors are scored for each candidate 202, and the candidates 202 (if more than one) are ranked according to the scores in descending order. In this manner, the task owner 204 can send a request to the most suitable (highest scoring) candidate 202 for granting privileges to perform the task 206 so that the task 206 can be performed in a timely manner if the task owner 204 is unable to complete the task 206 him or herself. After the task 206 is complete, the privileges granted to the candidate 202 can be revoked.

In some examples, all candidates 202 will have had at least one electronic communication or interaction with the task owner 204 under an assumption that if the task owner 204 and the candidate 202 have never communicated or otherwise interacted that the candidate 202 should not be considered.

Position Level

The position levels of the task owner 204 and each candidate 202 can be obtained, for example, from online profiles for each user. Such profiles may be stored, for example, in a human resources system. For example, the position level of a user can represent the user's level of authority within a project team (e.g., Staff 1, Senior 1, Senior 2, Software 1, Software 2, etc.). The lowest position level within all candidates 202 is set to 1 and the final value P(i) is normalized the highest position level within the group as follows:

$$P(i) = \frac{\text{position level of } i - \text{lowest position level} + 1}{\text{highest position level}}$$

Capability Level

The capability level represents the privileges held by each candidate 202. The privileges can be quantified, for example, as a value between zero and 1, where zero represents no privileges, a fractional value represents partial privileges to perform the task, and 1 represents full privileges to perform the task, such as follows:

| Type | Capability (score) | | | |
|------|------|------|------|------|
| Meeting | No privilege (0) | Guest (0.3) | Attendee (0.6) | Host (1) |
| Task | No privilege (0) | Read (0.3) | Assignee (0.6) | Reporter (1) |
| Repo | No privilege (0) | Read (0.3) | Write (0.6) | Admin (1) |
| Document | No privilege (0) | Read (0.3) | Write (0.6) | Admin (1) |

Task Similarity

Task similarity quantifies the extent to which each candidate has previously worked on tasks similar to the task to be performed on behalf of the task owner. Machine learning can be used to calculate a task similarity score for each task 206 the candidate 202 will potentially perform (e.g., to produce a similarity score between 0 and 1). The candidate recommendation service 114 maintains a list of all tasks 206 competed by the candidate 202 along with a task summary. For each completed task, the task summary is generated using term frequency-inverse document frequency to calculate a similarity score between each task candidate previously worked on and each to-be-granted task 206 as follows.

First, the candidate recommendation service 114 tokenizes task descriptions (e.g., sentences describing the task or words in a document associated with the task). Next, candidate recommendation service 114 creates a term frequency matrix TF(t) of the words in each task description (e.g., values representing the number of times each word appears in the task description) as follows:

$$TF(i) = \frac{\text{number of times term } i \text{ appears in a document}}{\text{number of terms in the document}}$$

Next, the candidate recommendation service 114 creates a table of documents ordered by word by calculating an inverse document frequency as follows:

$$IDF(i) = \log\left(\frac{\text{total number of documents}}{\text{number of documents with term } i}\right)$$

The candidate recommendation service 114 generates a term frequency-inverse document frequency matrix of words in the task descriptions as follows:

$$TF(i)-IDF(i)=TF(i)*IDF(i)$$

Next, the candidate recommendation service 114 scores each sentence and calculates a threshold value based on the average sentence score. The candidate recommendation service 114 then selects sentences having a score greater than the average score and merges the selected sentences together to form a summary, where higher scores represent a greater similarity with the task(s) by the user.

The candidate recommendation service 114 calculates a similarity score between a to-be-granted task 206 and one or more prior tasks using a text similarity process (e.g., Cosine similarity process as shown below), where A and B represent the to-be-granted task 206 and the one or more prior tasks, respectively:

$$\cos(\theta) = \frac{A \cdot B}{\|A\|\,\|B\|} = \frac{\sum_{i=1}^{n} A_i B_i}{\sqrt{\sum_{i=1}^{n} A_i^2}\,\sqrt{\sum_{i=1}^{n} B_i^2}}$$

Based on the result, only those candidates 202 who have previously performed tasks with a high similarity score to the to-be-granted task 206 (e.g., relative to a base value of 0.6) will be added into the list of recommended candidates.

Familiarity Between Task Owner and Candidate

Familiarity is defined as a function of a frequency of communication between the owner 204 of a given task 206 and each candidate 202 to be granted access to perform the task 206. Communications can include, for example, electronic communications such as emails, direct messages, and other exchanges of information involving the task owner 204 and the candidate 202. The greater the frequency of communication between the task owner 204 and the candidate 202, the greater the familiarity.

Example Scores

A score for each candidate 202 can be calculated by values representing the position level, the capability level, task similarity, and familiarity between the candidate 202 and the task owner 204. For example:

| Candidate | Position level | Capability level | Similarity Level | Familiarity |
|---|---|---|---|---|
| User1 in Base group | Staff 1 | Admin | HDX-345 | 1 |
| User2 in Base group | Senior 2 | Write | None | 1 |
| User3 in Base group | Senior 2 | Write | HDX-304 | 2 |
| User4 in Base group | Senior 1 | Write | None | 0 |
| User5 in Base group | Senior 1 | Read | None | 0 |
| User6 in Base group | Software 2 | Read | None | 0 |

-continued

| Candidate | Position level | Capability level | Similarity Level | Familiarity |
|---|---|---|---|---|
| User7 in Base group | Software 1 | No privilege | None | 0 |
| User8 in Base group | Software 2 | Write | HDX-312, HDX-269 | 3 |

For the position level, in this example, the lowest position is Software 1 while the highest position is Senior 2. Thus, the position level value for each candidate is:

| Candidate | Position level | Position level value (raw) | Position level value (normalized) |
|---|---|---|---|
| User1 in Base group | Staff 1 | 5 | 5/5 |
| User2 in Base group | Senior 2 | 4 | 4/5 |
| User3 in Base group | Senior 2 | 4 | 4/5 |
| User4 in Base group | Senior 1 | 3 | 3/5 |
| User5 in Base group | Senior 1 | 3 | 3/5 |
| User6 in Base group | Software 2 | 2 | 2/5 |
| User7 in Base group | Software 1 | 1 | 1/5 |
| User8 in Base group | Software 2 | 2 | 2/5 |

Position level value (normalized by the highest position level value 5) of User1, User2, User3, User4, User5, User6, User7, User8 are 1, 0.8, 0.8, 0.6, 0.6, 0.4, 0.2, and 0.4, respectively. For the capability level, capability values of User1, User2, User3, User4, User5, User6, User7, User8 are 1, 0.6, 0.6, 0.6, 0.3, 0.3, 0, and 0.6, respectively. For the task similarity, according to TF-IDF, the similarity values of User1, User2, User3, User4, User5, User6, User7, User8 are 0.6, 0, 0.6, 0, 0, 0, 0, and 0.8, respectively. For the familiarity, the frequency values of User1, User2, User3, User4, User5, User6, User7, User8 are 1, 1, 2, 0, 0, 0, 0, and 3, respectively. After being normalized by 3, which is the highest familiarity value among this set of users, the normalized familiarity values are ⅓, ⅓, ⅔, 0, 0, 0, 0, and 1, respectively.

Based on the above, a final score can be obtained as follows:

Final score=position level*0.25+capability level*0.25+similarity level*0.25+familiarity*0.25

| Person | Position level (score) | Capability level (score) | Task similarity (score) | Familiarity (score) | Final score |
|---|---|---|---|---|---|
| User1 in Base group | Staff 1 (1) | Admin (1) | HDX-345 (0.6) | 1 (0.3) | 0.725 |
| User2 in Base group | Senior 2 (0.8) | Write (0.6) | None (0) | 1 (0.3) | 0.425 |
| User3 in Base group | Senior 2 (0.8) | Write (0.6) | HDX-304 (0.6) | 2 (0.6) | 0.65 |
| User4 in Base group | Senior 1 (0.6) | Write (0.6) | None (0) | 0 (0) | 0.3 |
| User5 in Base group | Senior 1 (0.6) | Read (0.3) | None (0) | 0 (0) | 0.225 |
| User6 in Base group | Software 2 (0.4) | Read (0.3) | None (0) | 0 (0) | 0.175 |
| User7 in Base group | Software 1 (0.2) | No privilege (0) | None (0) | 0 (0) | 0.05 |
| User8 in Base group | Software 2 (0.4) | Write (0.6) | HDX-312, HDX-269 (0.8) | 3 (1) | 0.7 |

For a threshold of 0.6, all scores less than 0.6 are discarded (e.g., User2, User4, User5, User6, and User7), hence, the candidate list in descending order by score is User1, User8, and User3. Thus, User1, User8, and User3 are candidates 202 for performing the task 206.

Example Privilege Management Process

Figure 9:
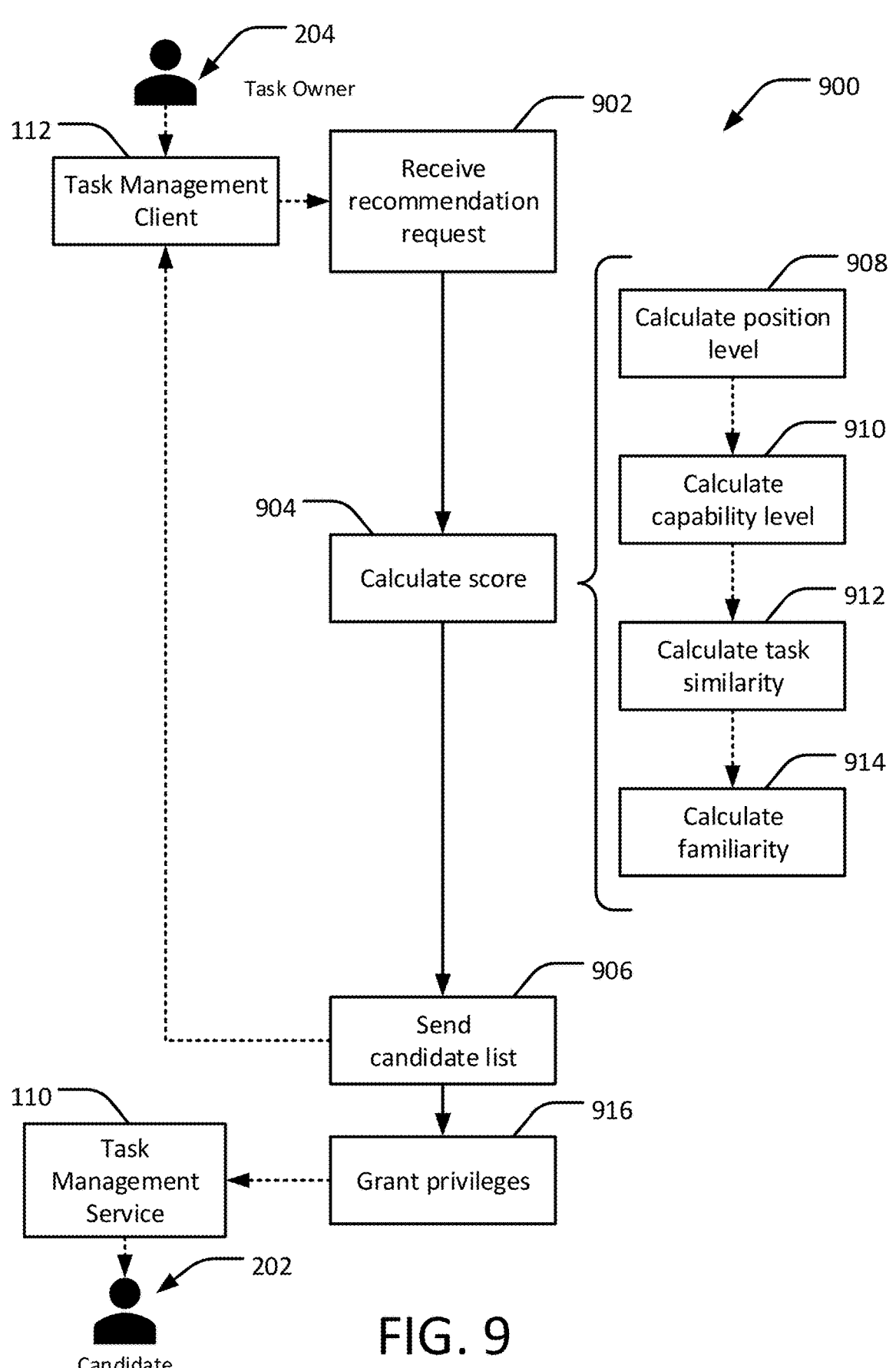
FIG. 9 is a flow diagram of an example privilege management process, in accordance with an example of the present disclosure.

FIG. 9 is a flow diagram of an example privilege management process 900, in accordance with an example of the present disclosure. The process 900 can be implemented, for example, in the system 100 of FIG. 1. The process 900 includes receiving 902, from a privilege management service, a request to recommend a candidate to perform a task (e.g., the task 206) on behalf of a first user (e.g., the task owner 204). The process 900 further includes calculating 904, responsive to the request to recommend the candidate, a recommendation score for each of a plurality of second users (e.g., the candidates 202) based on a position level score, a capability level score, a task similarity score, and a familiarity score. In some examples, the recommendation score is a weighted sum of the position level score, the capability level score, the task similarity score, and the familiarity score.

The process 900 further includes sending 906 a list of recommended candidates to the privilege management service for display to the first user, where the list of recommended candidates includes at least one of the second users for which the recommendation score is greater than a threshold score.

In some examples, the process 900 further comprises calculating 908 the position level score for each of the second users based on a difference between a position level of the first user and a position level of each of the second users. In some examples, the process 900 further includes calculating 910 the capability level score for each of the second users based on a capability level of each of the second users, where the capability level represents an existing privilege held by each of the second users for performing the task. In some examples, the process 900 further includes calculating 912 the task similarity score based at least in part on a term frequency-inverse document frequency matrix representing words in a description of the task to be performed on behalf of the first user and words in a description of one or more tasks previously performed by each of the second users. In some examples, the process 900 further includes calculating 914 the familiarity score based at least in part on a frequency of electronic communications between the first user and each of the second users.

In some examples, the process 900 includes granting 916, to one of the second users selected by the first user from the list of recommended candidates, one or more privileges for performing the task. For instance, in some examples, a task management service (e.g., the task management service 110 of FIG. 1) interoperates with a directory service to grant the one or more privileges to one of the second users.

Example Computing Device

Figure 10:
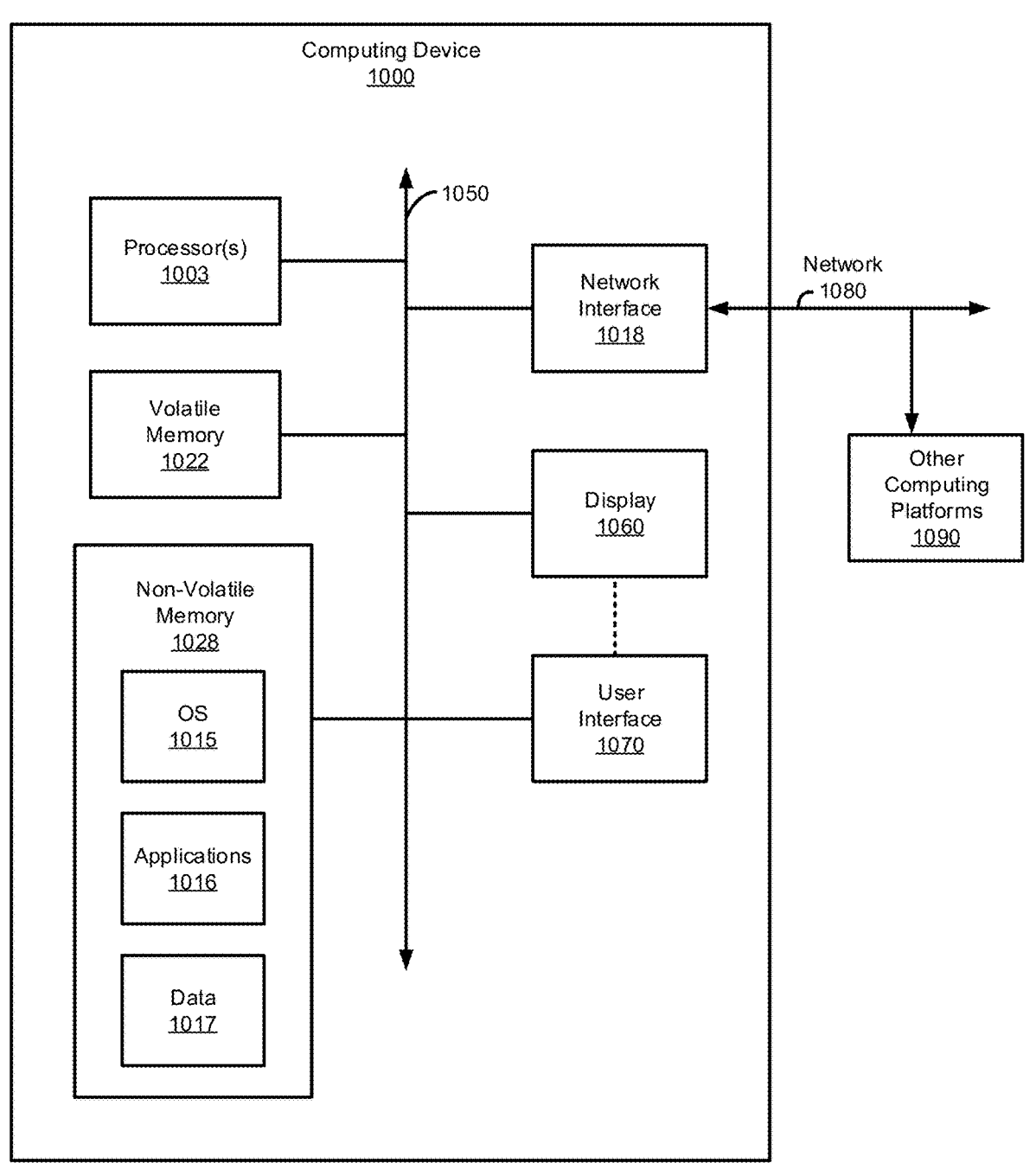
FIG. 10 is a block diagram of a computing device configured to implement various systems and processes in accordance with examples disclosed herein.

FIG. 10 is a block diagram of a computing device 1000 configured to implement various systems and processes in accordance with examples disclosed herein. It will be understood that multiple computing devices 1000 can be implemented according to the examples provided herein, where each of the computing devices 1000 is configured to perform certain functions in conjunction with other computing devices 1000. In some examples, the computing device 1000 can include a workstation, a laptop computer, a tablet, a mobile device, or any suitable computing or communication device. One or more components of the computing device 1000, including the client computing system 102 and/or the server 104 can include or otherwise be executed using one or more processors 1003, volatile memory (e.g., random access memory (RAM)) 1022, non-volatile machine-readable mediums (e.g., a non-volatile memory 1028), one or more network or communication interfaces 1018, a display 1060, a user interface (UI) 1070, and a communications bus 1050. The non-volatile (non-transitory) machine-readable mediums 1028 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface 1070 can include one or more input/output (I/O) devices (e.g., a mouse, a keyboard, a touch screen/monitor/panel, a microphone, one or more speakers, etc.). The display 1060 can provide a graphical user interface (GUI). The non-volatile memory 1028 stores an operating system (OS), one or more applications, and data such that, for example, computer instructions of the operating system and the applications, are executed by processor(s) out of the volatile memory. In some examples, the volatile memory 1022 can include one or more types of RAM and/or a cache memory that can offer a faster response time than a main memory. Data can be entered through the user interface 1070. Various elements of the computing device 1000 can communicate via the communications bus 1050 or the network interface 1018.

The computing device 1000 can also be referred to as a client device, a computing device, an endpoint device, a computer, a computer system, or a server. The computing device 1000 is shown as an example client computing system 102 and/or the server 104 and can be implemented within any computing or processing environment with any type of physical or virtual machine or set of physical and virtual machines that can have suitable hardware and/or software capable of operating as described herein. In some examples, some components of the computing device can be implemented virtually (e.g., using a combination of hardware and software), such as to provide GUI 120 to the task management client 112 of the client computing system 102, where the task management service 110 and/or the candidate recommendation service 114 emulates certain processing functions of the client computing system 102 (e.g., including at least portions of the method 900 of FIG. 9) using hardware components of the server 104 (e.g., processors, network communications hardware, I/O devices, etc.).

The non-volatile memory 1028 stores an operating system (OS) 1015, one or more applications or programs 1016, and data 1017. The OS 1015 and the applications 1016 include sequences of instructions that are encoded for execution by processor(s) 1003. Execution of these instructions results in manipulated data. Prior to their execution, the instructions can be copied to the volatile memory 1022. In some examples, the volatile memory 1022 can include one or more types of RAM and/or a cache memory that can offer a faster response time than a main memory. Data can be entered through the user interface 1070 or received from the other I/O device(s), such as the network interface 1018. The various elements of the computing device 1000 described above can communicate with one another via the communications bus 1050 and/or via the network interface 1018 to other computing platforms 1090.

The processor(s) 1003 can be implemented by one or more programmable processors to execute one or more executable instructions, such as a computer program, to perform the functions of the system. As used herein, the term "processor" describes circuitry or hardware that performs a function, an operation, or a sequence of operations. The function, operation, or sequence of operations can be hard coded into the circuitry or a data storage device, or soft coded by way of instructions held in the storage device and executed by the circuitry. A processor can perform the function, operation, or sequence of operations using digital values and/or using analog signals. In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 1003 can be analog, digital, or a combination of these. In some examples, the processor(s) 1003 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 1018 can include one or more interfaces to enable the computing device 1000 to access a computer network 1080 such as a Local Area Network (LAN), a Wide Area Network (WAN), a Personal Area Network (PAN), or the Internet through a variety of wired and/or wireless connections, including cellular connections and Bluetooth connections. In some examples, the network 1080 may allow for communication with other computing devices 1090, such as the client computing device 102 and/or the server 104 to enable distributed, shared, or cooperative computing (e.g., such as cooperatively functioning to enable and provide enable MFA to one or more of the applications 1016). The network 1080 can include, for example, one or more private and/or public networks over which computing devices can exchange data.

In described examples, the computing device 1000 can execute an application on behalf of a user of the client computing system 102. For example, the computing device 1000 can execute one or more virtual machines managed by a hypervisor. Each virtual machine can provide an execution session within which applications execute on behalf of a user or a client device, such as a hosted desktop session. The computing device 1000 can also execute a terminal services session to provide a hosted desktop environment. The computing device 1000 can provide access to a remote computing environment including one or more applications, one or more desktop applications, and one or more desktop sessions in which one or more applications can execute.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims. For example, the processes disclosed herein each represent a sequence of acts in a particular example. Some acts are optional and, as such, can be omitted in accord with one or more examples. Additionally, the order of acts can be altered, or other acts can be added, without departing from the scope of the apparatus and methods discussed herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A privilege management method comprising:
receiving, by a processor and from a first user via a privileges plugin, a request to recommend a candidate to perform a task on behalf of the first user;
calculating, by the processor and responsive to the request to recommend the candidate, a recommendation score for each of a plurality of second users based on a position level score, a capability level score, a task similarity score, and a familiarity score, wherein the familiarity score is calculated based at least in part on a frequency of electronic communications between the first user and each of the second users, and wherein task similarity score is calculated based at least in part on a term frequency-inverse document frequency matrix representing words in a description of the task to be performed on behalf of the first user and words in a description of one or more tasks previously performed by each of the second users;
sending, by the processor, a list of recommended candidates to the first user via the privileges plugin, the list of recommended candidates including at least one of the second users for which the recommendation score is greater than a threshold score; and
granting, to one of the second users selected by the first user from the list of recommended candidates, one or more privileges for performing the task.

2. The method of claim 1, further comprising calculating the position level score for each of the second users based on a difference between a position level of the first user and a position level of each of the second users.

3. The method of claim 1, further comprising calculating the capability level score for each of the second users based on a capability level of each of the second users, the capability level representing an existing privilege held by each of the second users for performing the task.

4. The method of claim 1, wherein the recommendation score is a weighted sum of the position level score, the capability level score, the task similarity score, and the familiarity score.

5. A computer program product including one or more non-transitory machine-readable mediums having instructions encoded thereon that when executed by at least one processor cause a process for managing privileges to be carried out, the process comprising:
receiving, from a first user via a privileges plugin, a request to recommend a candidate to perform a task on behalf of the first user;

calculating, responsive to the request to recommend the candidate, a recommendation score for each of a plurality of second users based on a position level score, a capability level score, a task similarity score, and a familiarity score, wherein the familiarity score is calculated based at least in part on a frequency of electronic communications between the first user and each of the second users, and wherein task similarity score is calculated based at least in part on a term frequency-inverse document frequency matrix representing words in a description of the task to be performed on behalf of the first user and words in a description of one or more tasks previously performed by each of the second users;

sending a list of recommended candidates to the first user via a privileges plugin, the list of recommended candidates including at least one of the second users for which the recommendation score is greater than a threshold score; and granting, to one of the second users selected by the first user from the list of recommended candidates, one or more privileges for performing the task.

6. The computer program product of claim 5, wherein the process further comprises calculating the position level score for each of the second users based on a difference between a position level of the first user and a position level of each of the second users.

7. The computer program product of claim 5, wherein the process further comprises calculating the capability level score for each of the second users based on a capability level of each of the second users, the capability level representing an existing privilege held by each of the second users for performing the task.

8. The computer program product of claim 5, wherein the recommendation score is a weighted sum of the position level score, the capability level score, the task similarity score, and the familiarity score.

9. A system comprising:

a storage; and at least one processor operatively coupled to the storage, the at least one processor configured to execute instructions stored in the storage that when executed cause the at least one processor to carry out a process for managing privileges, the process comprising:

receiving, from a first user via a privileges plugin, a request to recommend a candidate to perform a task on behalf of the first user;

calculating, responsive to the request to recommend the candidate, a recommendation score for each of a plurality of second users based on a position level score, a capability level score, a task similarity score, and a familiarity score, wherein the familiarity score is calculated based at least in part on a frequency of electronic communications between the first user and each of the second users, and wherein task similarity score is calculated based at least in part on a term frequency-inverse document frequency matrix representing words in a description of the task to be performed on behalf of the first user and words in a description of one or more tasks previously performed by each of the second users;

sending a list of recommended candidates to a privilege management service for display to the first user, the list of recommended candidates including at least one of the second users for which the recommendation score is greater than a threshold score; and granting, to one of the second users selected by the first user from the list of recommended candidates, one or more privileges for performing the task.

10. The system of claim 9, wherein the process further comprises calculating the position level score for each of the second users based on a difference between a position level of the first user and a position level of each of the second users.

11. The system of claim 9, wherein the process further comprises calculating the capability level score for each of the second users based on a capability level of each of the second users, the capability level representing an existing privilege held by each of the second users for performing the task.

* * * * *